US010050753B2

(12) United States Patent
Park et al.

(10) Patent No.: US 10,050,753 B2
(45) Date of Patent: Aug. 14, 2018

(54) METHOD AND DEVICE FOR MITIGATING INTER-CELL INTERFERENCE

(71) Applicant: LG ELECTRONICS, INC., Seoul (KR)

(72) Inventors: Kungmin Park, Seoul (KR); Heejeong Cho, Seoul (KR); Hyunsoo Ko, Seoul (KR); Hyeyoung Choi, Seoul (KR); Ilmu Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/505,811

(22) PCT Filed: Sep. 17, 2014

(86) PCT No.: PCT/KR2014/008646
§ 371 (c)(1),
(2) Date: Feb. 22, 2017

(87) PCT Pub. No.: WO2016/043356
PCT Pub. Date: Mar. 24, 2016

(65) Prior Publication Data
US 2017/0279574 A1 Sep. 28, 2017

(51) Int. Cl.
H04W 72/08 (2009.01)
H04L 5/00 (2006.01)
H04W 72/12 (2009.01)
H04B 17/309 (2015.01)
H04B 17/345 (2015.01)
H04J 1/16 (2006.01)

(52) U.S. Cl.
CPC .......... *H04L 5/0032* (2013.01); *H04B 17/309* (2015.01); *H04B 17/345* (2015.01); *H04J 1/16* (2013.01); *H04W 72/082* (2013.01); *H04W 72/1231* (2013.01)

(58) Field of Classification Search
CPC ... H04W 72/1231; H04W 72/082; H04J 1/16; H04B 17/345; H04B 17/309
USPC .................. 455/442, 453; 370/260, 267, 299
See application file for complete search history.

(56) References Cited

U.S. PATENT DOCUMENTS

2008/0248773 A1 10/2008 De Carvalho et al.
2012/0057525 A1* 3/2012 Hou .................. H04W 72/1215
370/328

FOREIGN PATENT DOCUMENTS

| KR | 10-2008-0091398 A | 10/2008 |
| KR | 10-2009-0056730 A | 6/2009 |
| KR | 10-2010-0017822 A | 2/2010 |
| WO | 2013/158356 A1 | 10/2013 |

* cited by examiner

*Primary Examiner* — Sam Bhattacharya
(74) *Attorney, Agent, or Firm* — Dentons US LLP

(57) ABSTRACT

Disclosed is a method for mitigating inter-cell interference. A method for mitigating inter-cell interference can comprise the steps of: a terminal, which is being serviced by means of a fixed cell, receiving from the fixed cell a first signal that is generated on the basis of a first STBC; the terminal, in time resources overlapping the reception time of the first signal, receiving from a moving cell a second signal that is generated on the basis of a second STBC; and the terminal determining a transmission symbol component on the basis of the first signal and an interference component on the basis of the first signal and the second signal.

8 Claims, 10 Drawing Sheets

FIG. 6

STBC of fixed cell $$\begin{bmatrix} Z_0 & Z_1^* & 0 & 0 \\ 0 & 0 & Z_2 & Z_3^* \\ Z_1 & -Z_0^* & 0 & 0 \\ 0 & 0 & Z_3 & -Z_2^* \end{bmatrix}$$

[0, 1] [2,3]

STBC 1 of moving cell $$\begin{bmatrix} Y_0 & 0 & Y_0 & 0 \\ 0 & Y_1 & 0 & Y_1 \\ Y_0^* & 0 & -Y_0^* & 0 \\ 0 & Y_1^* & 0 & -Y_1^* \end{bmatrix}$$

[0, 2] [1,3]

STBC 2 of moving cell $$\begin{bmatrix} Y_0 & 0 & 0 & Y_0 \\ 0 & Y_1 & Y_1 & 0 \\ Y_0^* & 0 & 0 & -Y_0^* \\ 0 & Y_1^* & -Y_1^* & 0 \end{bmatrix}$$

[0, 3] [1,2]

METHOD AND DEVICE FOR MITIGATING INTER-CELL INTERFERENCE

CROSS-REFERENCE TO RELATED APPLICATIONS

This application is the National Stage filing under 35 U.S.C. 371 of International Application No. PCT/KR2014/008646, filed on Sep. 17, 2014, the contents of which are all hereby incorporated by reference herein in their entirety.

BACKGROUND OF THE INVENTION

Field of the Invention

The present invention relates to wireless communications, and more particularly, to a method and a device for mitigating inter-cell interference.

Related Art

A transmission mode based on orthogonal frequency-division multiplexing access (OFDMA) may independently allocate one or more subcarriers to each user equipment (UE). Thus, it is possible to efficiently allocate frequency resources without intra-cell frequency interference at a UE's request.

In a cellular network system, system performance may significantly change depending on the location of a terminal in a cell. Particularly, inter-cell interference may substantially degrade the performance of a terminal located on the boundary of the cell. Further, with higher frequency reuse efficiency, a high data transmission rate may be obtained in the center of the cell, while inter-cell interference becomes serious. Accordingly, the terminal on the boundary receives significant interference from a neighboring cell and thus has a greater decrease in signal-to-interference-plus-noise ratio (SINR).

In order to mitigate inter-cell interference in an orthogonal frequency-division multiple access (OFDMA) cellular network system, studies have been conducted on techniques for avoiding inter-cell interference, techniques for averaging inter-cell interference effects, and techniques for eliminating inter-cell interference.

In a current cellular network system, there are a large number of moving cells. Inter-cell interference may occur between moving cells and fixed cells. Methods are needed to mitigate interference between moving cells and fixed cells.

SUMMARY OF THE INVENTION

An object of the present invention is to provide a method for mitigating inter-cell interference.

Another object of the present invention is to provide a device for mitigating inter-cell interference.

A method for mitigating inter-cell interference according to one aspect of the present invention to achieve the foregoing object of the present invention may include: receiving, by a user equipment (UE) served by a fixed cell, a first signal generated based on a first space-time block code (STBC) from the fixed cell; receiving, by the UE, a second signal generated based on a second STBC from a moving cell on a time resource overlapping with a reception time for the first signal; and determining, by the UE, a transmission symbol component based on the first signal and an interference component based on the first signal and the second signal, wherein the first STBC may be determined based on a transmission symbol combination of the fixed cell, the second STBC may be determined based on a transmission symbol combination of the moving cell, and the interference component may be interference-averaged based on the first signal and the second signal.

A UE served by a fixed cell according to another aspect of the present invention to achieve the foregoing object of the present invention may include: a radio frequency (RF) unit configured to transmit or receive a radio signal; and a processor operatively connected to the RF unit, wherein the processor may be configured to: receive a first signal generated based on a first space-time block code (STBC) from the fixed cell; receive a second signal generated based on a second STBC from a moving cell on a time resource overlapping with a reception time for the first signal; and determine a transmission symbol component based on the first signal and an interference component based on the first signal and the second signal, the first STBC may be determined based on a transmission symbol combination of the fixed cell, the second STBC may be determined based on a transmission symbol combination of the moving cell, and the interference component may be interference-averaged based on the first signal and the second signal.

According to the present invention, inter-cell interference between moving cells having a quickly changing channel state may be mitigated based on precoding of a transmitting end. Specifically, interference signals included reception signals of a receiving end may be averaged to fade out based on precoding of the transmitting end, without the receiving end performing averaging of interference. Further, interference in each of a plurality of reception symbols may be randomized.

BRIEF DESCRIPTION OF THE DRAWINGS

FIG. 6 is a conceptual view illustrating STBCs used for a transmitter of a fixed cell and a transmitter of a moving cell according to an embodiment of the present invention.

DESCRIPTION OF EXEMPLARY EMBODIMENTS

Figure 1:
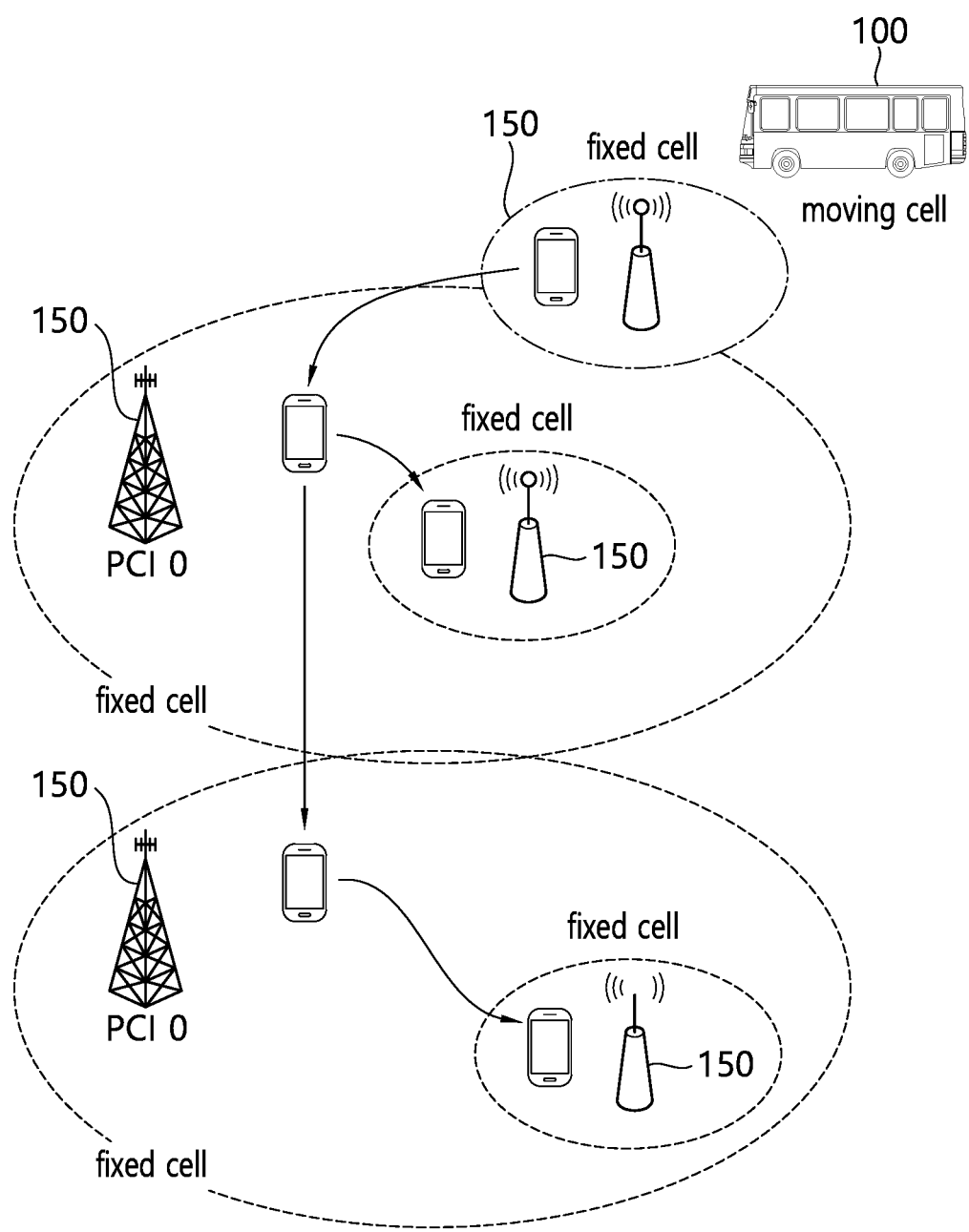
FIG. 1 is a conceptual view illustrating the movement of a moving cell.

FIG. 1 is a conceptual view illustrating the movement of a moving cell.

In the following embodiments, a moving cell may denote a base station (BS) that moves, and a fixed cell may denote a BS that remains stationary at a fixed location. A moving cell may be denoted by a moving BS, and a fixed cell may be denoted by a fixed BS.

For example, a moving cell 100 may be a BS installed in a moving object, such as a bus. Based on buses running in Seoul, about 2000 moving cells 100 may be present. Therefore, interference between the moving cells 100 and fixed cells 150 is highly likely to occur in a current cellular network system.

For inter-cell interference (ICI) between fixed cells 150, resource division may be performed in view of the distance between a BS and a terminal in order to mitigate the inter-cell interference. Alternatively, interference may be mitigated by performing dynamic resource division or cooperative communication based on sharing channel information between cells.

However, it is difficult to apply the same methods for controlling interference between fixed cells 150 to the moving cell 100.

Figure 2:
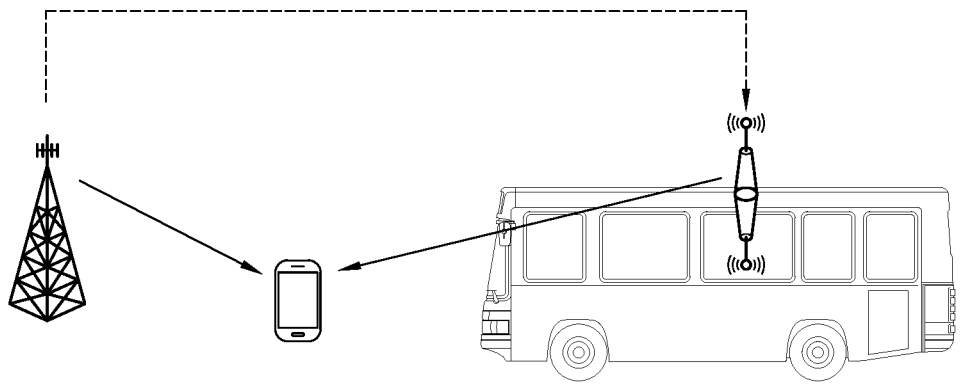
FIG. 2 is a conceptual view illustrating a problem that occurs when interference between a moving cell and a fixed cell is controlled by a conventional inter-cell interference control method.
Figure 2:
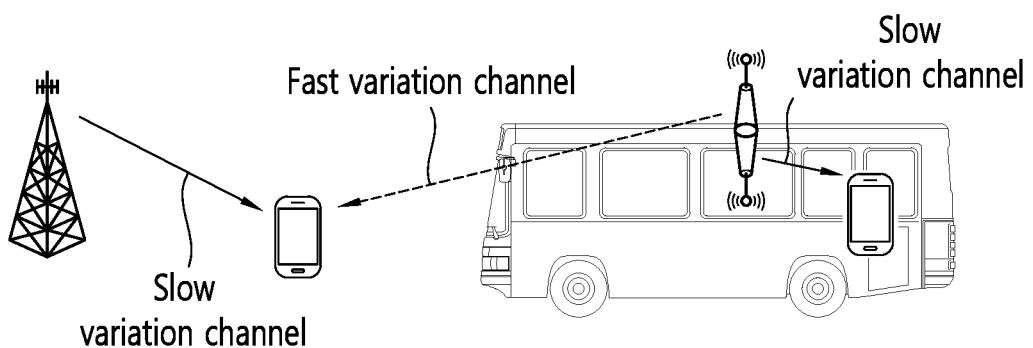

FIG. 2 is a conceptual view illustrating a problem that occurs when interference between a moving cell and a fixed cell is controlled by a conventional inter-cell interference control method.

In a moving cell, services are frequently provided through real-time traffic. Thus, interference control based on semi-static resource division may be inappropriate for the moving cell.

Referring to the upper part of FIG. 2, a moving cell may be connected to another cell based on a wireless backhaul. Thus, it may be difficult to use an inter-cell interference mitigation method based on dynamic resource division or cooperative communication through sharing of channel information. Specifically, in joint transmission (JT)/dynamic point selection (DPS), data to be transmitted to a terminal needs to be shared through a wired backhaul between BSs. However, data sharing between a moving cell and a fixed cell through the wireless backhaul needs the use of additional wireless resources and may be difficult to stably achieve according to a wireless channel condition. Thus, it may be difficult to mitigate interference between a fixed cell and a moving cell based on cooperative communication.

Referring to the lower part of FIG. 2, a channel between a moving cell and a fixed cell may be quickly changed by the movement of the moving cell. Thus, interference mitigation may be impossible through closed loop multiple-input and multiple-output (MIMO). Thus, it is necessary to develop a technique for controlling and reducing interference in a situation where sharing inter-cell signals and interference channel information is not smoothly performed. Particularly, open loop interference mitigation is needed to mitigate interference by a moving cell.

According to an embodiment of the present invention, inter-cell interference, specifically interference between a moving cell and a fixed cell, may be mitigated based on inter-cell interference randomizing and inter-cell interference averaging.

Inter-cell interference randomizing is a method of randomizing interferences from neighboring cells to approximate inter-cell interference by additive white Gaussian noise (AWGN). Inter-cell interference randomizing may reduce the effect of a channel decoding process by a signal from another user, for example, based on cell-specific scrambling and cell-specific interleaving.

Inter-cell interference averaging is a method of averaging all interferences from neighboring cells or averaging inter-cell interferences at channel coding block level through symbol hopping.

Hereinafter, an inter-cell interference randomization method and an inter-cell interference averaging method are specifically illustrated to mitigate interference between a moving cell and a fixed cell.

Figure 3:
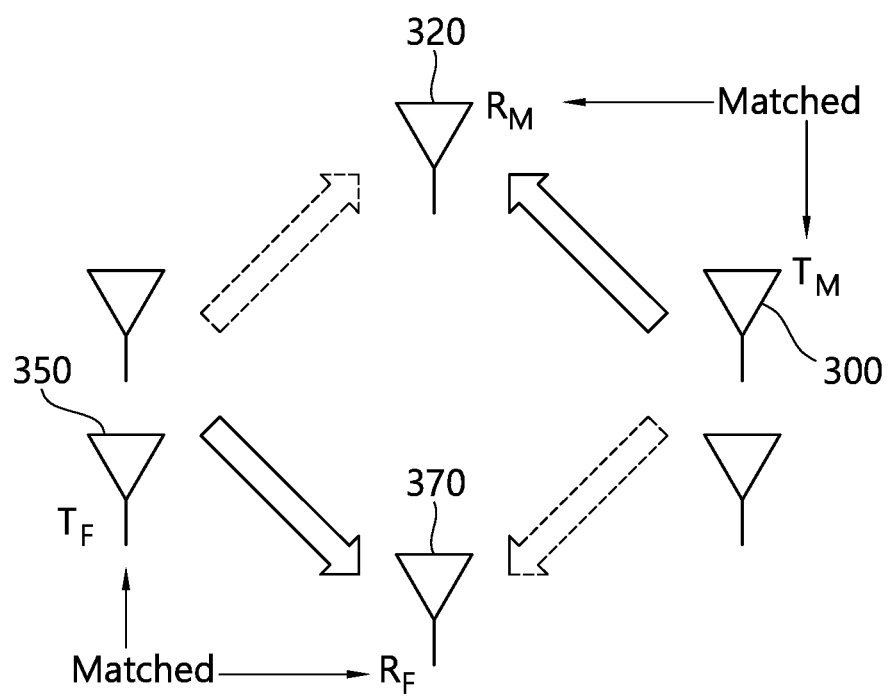
FIG. 3 is a conceptual view illustrating a method for mitigating interference between a moving cell and a fixed cell according to an embodiment of the present invention.

FIG. 3 is a conceptual view illustrating a method for mitigating interference between a moving cell and a fixed cell according to an embodiment of the present invention.

In the embodiment of the present invention illustrated below, the fixed cell may be represented by $T_F$, and a UE 370 served by the fixed cell may be represented by $R_F$. Further, the moving cell 300 may be represented by $T_M$, and a UE 320 served by the moving cell may be represented by $R_M$.

Referring to FIG. 3, the fixed cell 350 and the UE 370 served by the fixed cell may be matched to each other, and data transmission and/or reception based on full spatial diversity may be guaranteed between the fixed cell 350 and the UE 370 served by the fixed cell. Further, the moving cell 300 and the UE 320 served by the moving cell may be matched to each other, and data transmission and/or reception based on full spatial diversity may be guaranteed between the moving cell 300 and the UE 320 served by the moving cell.

In the embodiment of the present invention, an interference signal may be received through a channel of a diversity order or higher physically available between the fixed cell and the moving cell. For example, virtual interference signal channels may be additionally created as if interference signals are received through a greater number of interference channels than the number of interference channels available for the UEs 320 and 370 based on the actual number of antennas on the basis of precoding of the fixed cell 350 or the moving cell 300. Using this method, interference signals may be averaged at the receivers 320 and 370 and interference in each receiving symbol may also be randomized at the UEs 320 and 370.

Hereinafter, disclosed is precoding of a fixed cell and a moving cell to perform inter-cell interference randomization and inter-cell interference averaging without being affected by a correlation in channel between the moving cell and the fixed cell.

Figure 4:
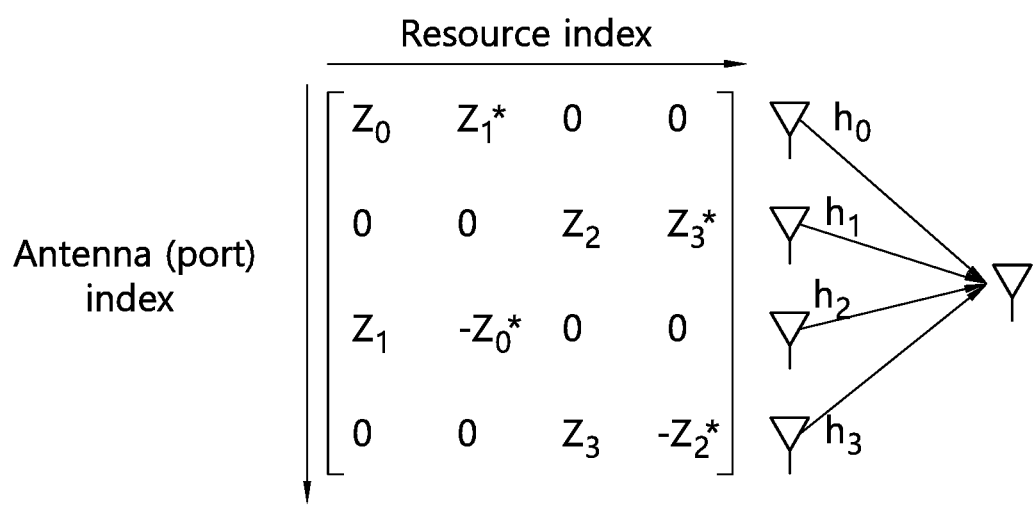
FIG. 4 illustrates a code for space-time diversity coding (STC) used for a fixed cell according to an embodiment of the present invention.

FIG. 4 illustrates a code for space-time diversity coding (STC) used for a fixed cell according to an embodiment of the present invention.

FIG. 4 illustrates a space-time block code (STBC) used for a fixed cell for inter-cell interference randomization and inter-cell interference averaging.

Referring to FIG. 4, the STBC used for the fixed cell may be a code for transmission based on full transmit diversity between the fixed cell and a UE served by the fixed cell.

Each element ($Z_n$) of the STBC may be a combination of two or more transmission symbols. Specifically, the transmission symbols may be $X_0$, $X_1$, $X_2$ and $X_3$, and $Z_0=X_0+X_1$, $Z_1=X_0-X_1$, $Z_2=X_2+X_3$, and $Z_3=X_2-X_3$.

A row of the STBC may correspond to each of antennas (($A_0$, $A_1$, $A_2$, $A_3$)) of the fixed cell, and a column of the STBC may correspond to a transmission resource (time resource or frequency resource).

Specifically, relationships between antenna ports of the fixed cell and transmission symbol combinations in a first transmission resource may be represented by $A_0:Z_0$, $A_1:0$, $A_2:Z_1$, and $A_3:0$. Relationships between antenna ports of the fixed cell and transmission symbol combinations in a second transmission resource may be represented by $A_0:Z_1^*$, $A_1:0$, $A_2:-Z_0^*$, and $A_3:0$. Relationships between antenna ports of the fixed cell and transmission symbol combinations in a third transmission resource may be represented by $A_0:0$, $A_1:Z_2$, $A_2:0$, and $A_3:Z_3$. Relationships between antenna ports of the fixed cell and transmission symbol combinations in a fourth transmission resource may be represented by $A_0:0$, $A_1:Z_3^*$, $A_2:0$, and $A_3:-Z_{2*}$.

A transmission symbol combination transmitted from the fixed cell may be received by the UE served by the fixed cell as follows.

$$R(4i)=h_0Z_0(i)+h_2Z_1(i)=r_0(i)$$

$$R(4i+1)=h_0Z_1^*(i)-h_2Z_0^*(i)=r_1(i)$$

$$R(4i+2)=h_1Z_2(i)-h_3Z_3(i)=r_2(i)$$

$$R(4i+3)=h_1Z_3^*(i)-h_3Z_2^*(i)=r_3(i) \quad \text{[Equation 1]}$$

In Equation 1, $h_0$ represents a channel coefficient between antenna $A_0$ of the fixed cell and the UE served by the fixed cell, $h_1$ represents a channel coefficient between antenna $A_1$ of the fixed cell and the UE served by the fixed cell, $h_2$ represents a channel coefficient between antenna $A_2$ of the fixed cell and the UE served by the fixed cell, $h_3$ represents a channel coefficient between antenna $A_3$ of the fixed cell and the UE served by the fixed cell.

$r_0(i)$ may denote a first reception signal received by the UE served by the fixed cell through the first transmission resource, $r_1(i)$ may denote a second reception signal received by the UE served by the fixed cell through the second transmission resource, $r_2(i)$ may denote a third reception signal received by the UE served by the fixed cell through the third transmission resource, and $r_3(i)$ may denote a fourth reception signal received by the UE served by the fixed cell through the fourth transmission resource.

The first reception signal to the fourth reception signal may be derived with a reception symbol based on Equation 2.

$$R_F(Z_0)=h_0^*r_0-h_2r_1^*$$

$$R_F(Z_1)=h_2^*r_0+h_0r_1^*$$

$$R_F(Z_2)=h_1^*r_2-h_3r_3^*$$

$$R_F(Z_3)=h_3^*r_2+h_2r_3^* \quad \text{[Equation 2]}$$

A symbol $Z_n$ transmitted from the fixed cell may be received by the UE served by the fixed cell as in Equation 2. If a modulation scheme, such as $$Z_{2n} = \frac{(X_{2n} + X_{2n+1})}{2} \text{ and } Z_{2n+1} = \frac{(X_{2n} - X_{2n+1})}{2},$$

is used for additional diversity gain, a symbol Xn may be received through an additional operation as in Equation 2-1.

$$R_F(X_0) = \frac{R_F(Z_0) + R_F(Z_1)}{2}$$

$$R_F(X_1) = \frac{R_F(Z_0) - R_F(Z_1)}{2}$$

$$R_F(X_2) = \frac{R_F(Z_2) + R_F(Z_3)}{2}$$

$$R_F(X_3) = \frac{R_F(Z_2) - R_F(Z_3)}{2} \quad \text{[Equation 2-1]}$$

$$\hat{X}_n = \left(\frac{|h_0|^2 + |h_1|^2 + |h_2|^2 + |h_3|^2}{2}\right)X_n$$

Referring to Equation 2 and Equation 2-1, the reception symbol may obtain full diversity gain based on the transmission symbol.

The fixed cell using the foregoing STBC may be referred to as a full-rank and full-diversity transmitter.

Figure 5:
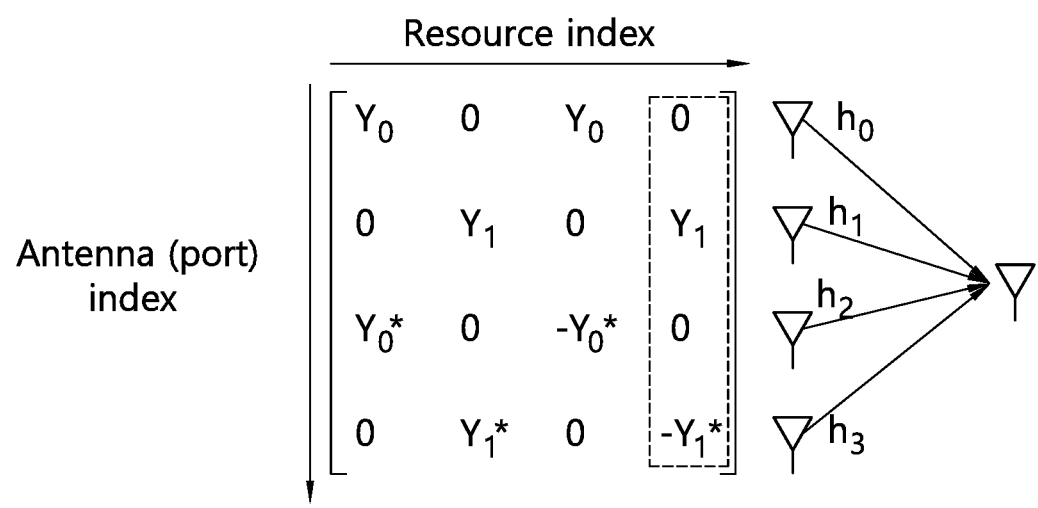
FIG. 5 illustrates a code for STC used for a moving cell according to an embodiment of the present invention.

FIG. 5 illustrates a code for STC used for a moving cell according to an embodiment of the present invention.

FIG. 5 illustrates an STBC used for a transmitter of the moving cell for inter-cell interference randomization and inter-cell interference averaging.

Referring to FIG. 5, the STBC used for the moving cell used the same full transmission diversity order as used for the fixed cell but may transmit halved symbols in the same time resource. The moving cell using such a STBC may be referred to as a half-rank and full-diversity transmitter.

Each element ($Y_n$) of the STBC used for the moving cell may be a combination of two or more transmission symbols. Specifically, the transmission symbols may be $S_0$, $S_1$, $S_2$, and $S_3$, and $Y_0=S_0+S_1$ and $Y_1=S_0-S_1$. A row of the STBC may correspond to each of antennas ($B_0$, $B_1$, $B_2$, and $B_3$) of the moving cell, and a column of the STBC may correspond to each transmission resource of the moving cell.

A transmission symbol based on only one transmission resource symbol combination may be transmitted on one transmission resource based on the STBC used for the moving cell. Further, the STBC used for the moving cell may not allow mapping of successive transmission resources to the same transmission symbol combination.

Specifically, relationships between antenna ports of the moving cell and transmission symbol combinations in a first transmission resource may be represented by $B_0:Y_0$, $B_1:0$, $B_2:Y_0^*$, and $B_3:0$. Relationships between antenna ports of the moving cell and transmission symbol combinations in a second transmission resource may be represented by $B_0:0$, $B_1: Y_1$, $B_2:0$, and $B_3: Y_1^*$. Relationships between antenna ports of the moving cell and transmission symbol combinations in a third transmission resource may be represented by $B_0:Y_0$, $B_1:0$, $B_2:-Y_0^*$, and $B_3:0$. Relationships between antenna ports of the moving cell and transmission symbol combinations in a fourth transmission resource may be represented by $B_0:0$, $B_1: Y_1$, $B_2:0$, $B_3: -Y_1^*$.

A transmission symbol combination transmitted from the moving cell may be received by a UE served by the moving cell as below in Equation 3.

$$R(4i)=h_0Y_0(i)+h_2Y_0^*(i)=r_0(i)$$

$$R(4i+1)=h_1Y_1(i)-h_3Y_1^*(i)=r_1(i)$$

$$R(4i+2)=h_0Y_0^*(i)-h_2Y_0^*(i)=r_2(i)$$

$$R(4i+3)=h_1Y_1(i)-h_3Y_1^*(i)=r_3(i) \quad \text{[Equation 3]}$$

In Equation 3, $h_0$ represents a channel coefficient between antenna $B_0$ of the moving cell and the UE served by the moving cell, $h_1$ represents a channel coefficient between antenna $B_1$ of the moving cell and the UE served by the moving cell, $h_2$ represents a channel coefficient between antenna $B_2$ of the moving cell and the UE served by the moving cell, $h_3$ represents a channel coefficient between antenna $B_3$ of the moving cell and the UE served by the moving cell.

$r_0(i)$ may denote a first reception signal received by the UE served by the moving cell through the first transmission resource, $r_1(i)$ may denote a second reception signal received by the UE served by the moving cell through the second transmission resource, $r_2(i)$ may denote a third reception signal received by the UE served by the moving cell through the third transmission resource, and $r_3(i)$ may denote a fourth reception signal received by the UE served by the moving cell through the fourth transmission resource.

The first reception signal to the fourth reception signal may be derived with a reception symbol based on Equation 4.

$$R_F(Y_0) = h_0^* r_0 - h_2 r_2^*$$
$$R_F(Y_1) = h_1^* r_0 + h_3 r_1^*$$
$$R_F(S_0) = \frac{R_F(Y_0) + R_F(Y_1)}{2}$$
$$R_F(S_1) = \frac{R_F(Y_0) - R_F(Y_1)}{2}$$
$$\hat{S}_n = \left( \frac{|h_0|^2 + |h_1|^2 \; |h_2|^2 + |h_3|^2}{2} \right) S_n$$
[Equation 4]

Referring to Equation 4, the reception symbol received by the UE served by the moving cell may obtain full diversity gain based on the transmission symbol. However, the number of reception symbols transmitted on the same resource may be reduced by half as compared with the fixed cell.

FIG. 6 is a conceptual view illustrating STBCs used for a transmitter of a fixed cell and a transmitter of a moving cell according to an embodiment of the present invention.

The upper part of FIG. 6 illustrates an STBC available for a fixed cell. Although the upper part of FIG. 6 shows one illustrative STBC, various combinations of STBCs for full-rank and full-diversity transmission may be used as an STBC for the fixed cell.

Referring to the upper part of FIG. 6, the fixed-cell STBC used for the fixed cell may be determined to transmit the same transmission symbols through each of a first transmission resource and a second transmission resource. Transmission symbols based on two transmission symbol combinations may be transmitted via the first transmission resource and the second transmission resource. For example, transmission symbols based on transmission symbol combinations $(Z_0, Z_1)$ may be transmitted through the first transmission resource, and transmission symbols based on transmission symbol combinations $(Z_1^*, -Z_0^*)$ may be transmitted through the second transmission resource.

Further, the fixed-cell STBC used for the fixed cell may be determined to transmit the same transmission symbols through each of a third transmission resource and a fourth transmission resource. Transmission symbols based on two transmission symbol combinations may be transmitted via the third transmission resource and the fourth transmission resource. For example, transmission symbols based on transmission symbol combinations $(Z_2, Z_3)$ may be transmitted through the third transmission resource, and transmission symbols based on transmission symbol combinations $(Z_3^*, -Z_2^*)$ may be transmitted through the fourth transmission resource.

The lower part of FIG. 6 illustrates STBCs available for a moving cell. Although the lower part of FIG. 6 illustrates two available STBC (moving-ell STBC 1 and moving-cell STBC 2), various combinations of STBCs may be used as an STBC for the moving cell. The STBCs for the moving cell may be determined not to allow mapping of successive transmission resources to the same transmission symbol combination and to transmit transmission symbols based on one transmission symbol combination via one transmission resource.

Referring to moving-cell STBC 1 in the lower part of FIG. 6, the moving-cell STBC used for the moving cell may be determined to transmit transmission symbols based on one transmission symbol combination through each of a first transmission resource and a third transmission resource. For example, a transmission symbol combination $(Y_0, Y_0^*)$ may be transmitted through the first transmission resource, and a transmission symbol combination $(Y_0, -Y_0^*)$ may be transmitted through the third transmission resource.

Further, the moving-cell STBC used for the moving cell may be determined to transmit transmission symbols based on one transmission symbol combination through each of a second transmission resource and a fourth transmission resource. One transmission symbol combination may be transmitted via each of the second transmission resource and the fourth transmission resource. For example, a transmission symbol combination $(Y_1, Y_1^*)$ may be transmitted through the second transmission resource, and a transmission symbol combination $(Y_1, -Y_1^*)$ may be transmitted through the fourth transmission resource.

Referring to moving-cell STBC 2 in the lower part of FIG. 6, the moving-cell STBC used for the moving cell may be determined to transmit transmission symbols based on one transmission symbol combination through each of the first transmission resource and the fourth transmission resource. One transmission symbol combination may be transmitted via each of the first transmission resource and the fourth transmission resource. For example, a transmission symbol combination $(Y_0, Y_0^*)$ may be transmitted through the first transmission resource, and a transmission symbol combination $(Y_0, -Y_0^*)$ may be transmitted through the fourth transmission resource.

Further, the moving-cell STBC used for the moving cell may be determined to transmit transmission symbols based on the same transmission symbol combination through each of the second transmission resource and the third transmission resource. One transmission symbol combination may be transmitted via each of the second transmission resource and the third transmission resource. For example, a transmission symbol combination $(Y_1, Y_1^*)$ may be transmitted through the second transmission resource, and a transmission symbol combination $(Y_1, -Y_1^*)$ may be transmitted through the third transmission resource.

When the foregoing STBCs are used for the fixed cell and the moving cell, a UE served by the fixed cell and a UE served by the moving cell may each receive a reception symbol through an interference-randomized and interference-averaged reception signal.

Figure 7:
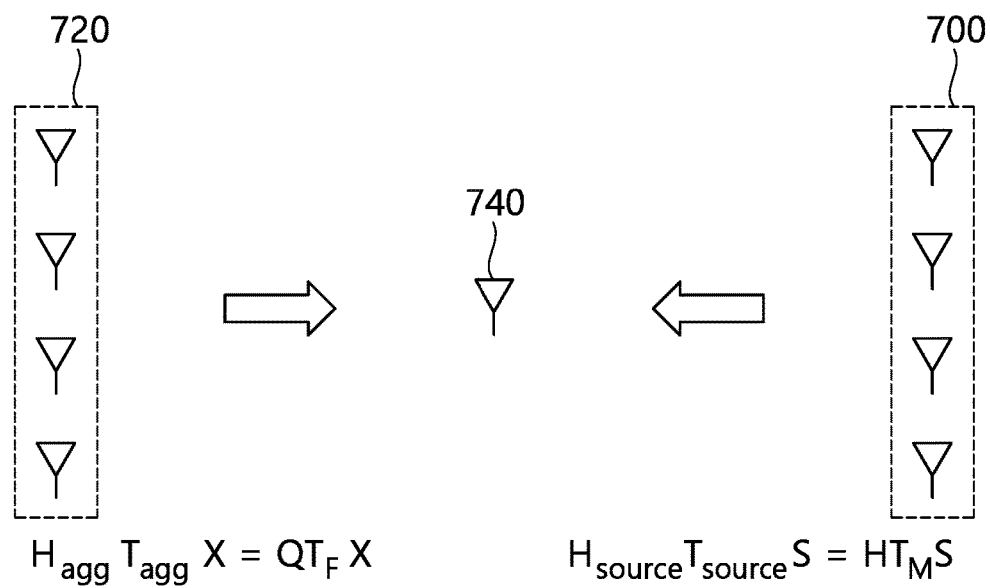
FIG. 7 illustrates a reception symbol received by a moving cell according to an embodiment of the present invention.

FIG. 7 illustrates a reception symbol received by a moving cell according to an embodiment of the present invention.

FIG. 7 illustrates that a transmission signal based on a transmission symbol combination is transmitted to a UE 740 served by a moving cell 700 through the moving cell and a transmission signal transmitted from a fixed cell 720 acts as an interference signal on the UE 740 served by the moving cell. It is assumed in FIG. 7 that the UE 740 served by the moving cell has one receiving antenna.

A reception signal (or reception symbol) received by the UE 740 served by the moving cell may include a transmission symbol component based on the transmission signal transmitted from the moving cell 700 and an interference component based on the transmission signal transmitted from the fixed cell 720.

Equation 5 below represents the transmission symbol component and the interference component of the reception symbol received by the UE 740 served by the moving cell.

$$\hat{S}_0 = \left( \frac{|h_0|^2 + |h_1|^2 + |h_2|^2 + |h_3|^2}{2} \right) S_0 + \quad \text{[Equation 5]}$$

$$\frac{h_0^* q_0 Z_0 + h_0^* q_2 Z_1 - h_2 q_1^* Z_2^* - h_2 q_3^* Z_3^* +}{2}$$
$$\frac{(h_1^* q_0 Z_1^* + h_1^* q_2 Z_0^* - h_3 q_1^* Z_3 - h_3 q_3^* Z_2)}{2}$$

$$\hat{S}_1 = \left( \frac{|h_0|^2 + |h_1|^2 + |h_2|^2 + |h_3|^2}{2} \right) S_1 +$$

$$\frac{h_0^* q_0 Z_0 + h_0^* q_2 Z_1 - h_2 q_1^* Z_2^* - h_2 q_3^* Z_3^* -}{2}$$
$$\frac{(h_1^* q_0 Z_1^* + h_1^* q_2 Z_0^* - h_3 q_1^* Z_3 - h_3 q_3^* Z_2)}{2}$$

Referring to Equation 5, a transmission symbol component of a reception symbol with respect to a first transmission symbol ($S_0$) is $$\left( \frac{|h_0|^2 + |h_1|^2 + |h_2|^2 + |h_3|^2}{2} \right) S_0,$$

and a transmission symbol component of a reception symbol with respect to a second transmission symbol ($S_1$) is $$\left( \frac{|h_0|^2 + |h_1|^2 + |h_2|^2 + |h_3|^2}{2} \right) S_1.$$

That is, a transmission symbol may be received based on full diversity between the moving cell 700 and the UE 740 served by the moving cell.

An interference component of the reception symbol with respect to the first transmission symbol ($S_0$) is $$\frac{h_0^* q_0 Z_0 + h_0^* q_2 Z_1 - h_2 q_1^* Z_2^* - h_2 q_3^* Z_3^* +}{2}$$
$$\frac{(h_1^* q_0 Z_1^* + h_1^* q_2 Z_0^* - h_3 q_1^* Z_3 - h_3 q_3^* Z_2)}{2},$$

and an interference component of the reception symbol with respect to the second transmission symbol ($S_1$) is $$\frac{h_0^* q_0 Z_0 + h_0^* q_2 Z_1 - h_2 q_1^* Z_2^* - h_2 q_3^* Z_3^* -}{2}$$
$$\frac{(h_1^* q_0 Z_1^* + h_1^* q_2 Z_0^* - h_3 q_1^* Z_3 - h_3 q_3^* Z_2)}{2}.$$

Referring to the interference components, a virtual interference channel may be generated between a channel (h) of the moving cell and an interference channel (q) based on a correlation between the channels. Thus, the UE 740 served by the moving cell may have the same effect as if receiving an interference signal through 8 interference channels which are greater than a full diversity order of 4, physically available with the fixed cell 720. Using this method, the interference components may be averaged to fade out in the UE 740 served by the moving cell.

Further, interference components in some interference channels among the interference components of the respective symbols have the same value. However, interference components in the remaining channels may have the opposite value of the value. Specifically, referring to the interference component of the reception symbol with respect to the first transmission symbol ($S_0$) and the interference component of the reception symbol with respect to the second transmission symbol ($S_1$), interference with respect to each of the first transmission symbol ($S_0$) and the second transmission symbol ($S_1$) may be determined by a interference component with the opposite sign, $+(h_1^* q_0 Z_1^* + h_1^* q_2 Z_0^* - h_3 q_1^* Z_3 - h_3 q_3^* Z_2)$ or $-(h_1^* q_0 Z_1^* + h_1^* q_2 Z_0^* - h_3 q_1^* Z_3 - h_3 q_3^* Z_2)$.

In this case, one symbol among different symbols has relatively greater interference, and the other symbol has relative less interference, thus randomizing interferences.

When the UE served by the moving cell has a greater number of receiving antennas, effects of interference averaging and interference randomization may increase.

Figure 8:
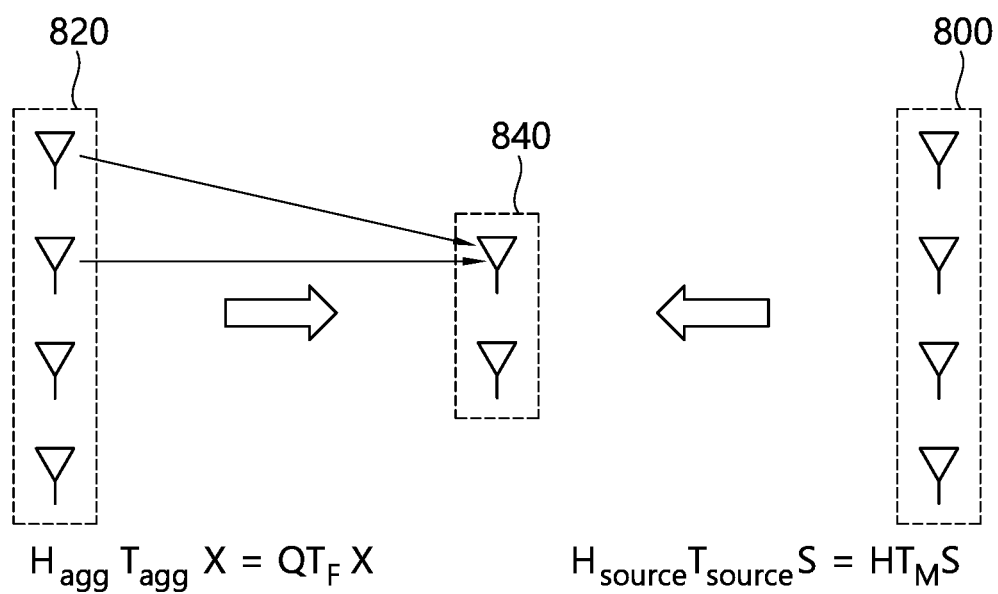
FIG. 8 illustrates a reception symbol received by a moving cell according to an embodiment of the present invention.

FIG. 8 illustrates a reception symbol received by a moving cell according to an embodiment of the present invention.

FIG. 8 illustrates that a transmission signal based on a transmission symbol combination is transmitted to a UE 840 served by a moving cell 800 through the moving cell and a transmission signal transmitted from a fixed cell 820 acts as an interference signal on the UE 740 served by the moving cell. It is assumed in FIG. 8 that the UE 840 served by the moving cell has two receiving antennas.

A reception signal (or reception symbol) received by the UE 840 served by the moving cell may include a transmission symbol component based on the transmission signal transmitted from the moving cell 800 and an interference component based on the transmission signal transmitted from the fixed cell.

Equation 6 below represents the transmission symbol component and the interference component of the reception symbol (or reception signal) received by a receiver of the UE 840 served by the moving cell.

$$\hat{S}_0 = \left( \frac{\begin{array}{c}|h_{00}|^2 + |h_{10}|^2 + |h_{20}|^2 + |h_{30}|^2 + |h_{01}|^2 + \\ |h_{11}|^2 + |h_{21}|^2 + |h_{31}|^2\end{array}}{2} \right) S_0 + \quad \text{[Equation 6]}$$

$$\frac{h_{00}^* q_{00} Z_0 + h_{00}^* q_{20} Z_1 - h_{20} q_{10}^* Z_2^* - h_{20} q_{30}^* Z_3^* +}{2}$$
$$\frac{(h_{10}^* q_{00} Z_1^* + h_{10}^* q_{20} Z_0^* - h_{30} q_{10}^* Z_3 - h_{30} q_{30}^* Z_2)}{2} +$$

$$\frac{h_{01}^* q_{01} Z_0 + h_{01}^* q_{21} Z_1 - h_{21} q_{11}^* Z_2^* - h_{21} q_{31}^* Z_3^* +}{2}$$
$$\frac{(h_{11}^* q_{01} Z_1^* + h_{11}^* q_{21} Z_0^* - h_{31} q_{11}^* Z_3 - h_{31} q_{31}^* Z_2)}{2}$$

Referring to Equation 6, a transmission symbol component of a reception symbol with respect to a first transmission symbol ($S_0$) is $$\hat{S}_0 = \left( \frac{\begin{array}{c}|h_{00}|^2 + |h_{10}|^2 + |h_{20}|^2 + |h_{30}|^2 + \\ |h_{01}|^2 + |h_{11}|^2 + |h_{21}|^2 + |h_{31}|^2\end{array}}{2} \right) S_0.$$

The transmission symbol component of the reception symbol may be received based on full diversity between the moving cell 800 and the UE 840 served by the moving cell.

An interference component of the reception symbol with respect to the first transmission symbol ($S_0$) is $$\frac{h_{00}^* q_{00} Z_0 + h_{00}^* q_{20} Z_1 - h_{20} q_{10}^* Z_2^* - h_{20} q_{30}^* Z_3^* + (h_{10}^* q_{00} Z_1^* + h_{10}^* q_{20} Z_0^* - h_{30} q_{10}^* Z_3 - h_{30} q_{30}^* Z_2)}{2} +$$

$$\frac{h_{01}^* q_{01} Z_0 + h_{01}^* q_{21} Z_1 - h_{21} q_{11}^* Z_2^* - h_{21} q_{31}^* Z_3^* + (h_{11}^* q_{01} Z_1^* + h_{11}^* q_{21} Z_0^* - h_{31} q_{11}^* Z_3 - h_{31} q_{31}^* Z_2)}{2}$$

Referring to the interference components, a virtual interference channel may be generated between a channel (h) of the moving cell and an interference channel (q) based on a correlation between the channels. Thus, the UE 840 served by the moving cell may have the same effect as if receiving an interference signal through 16 interference channels which are greater than a full diversity order of 8. Using this method, the interference component of the reception symbol may be averaged to fade out.

Although not mentioned with reference to another transmission symbol ($S_1$), as described above in FIG. 7, when one of the first transmission symbol ($S_0$) and a second transmission symbol ($S_1$) has relatively greater interference, the other symbol has relative less interference, thus randomizing interferences between the plurality of symbols.

In the foregoing embodiments, it is assumed that a fixed cell is an interference source in a UE served by a moving cell. On the contrary, according to an embodiment of the present invention, a moving cell may be an interference source in a UE served by a fixed cell.

Specifically, the UE served by the fixed cell may receive a first signal generated based on a first STBC from the fixed cell and may receive a second signal generated based on a second STBC from the moving cell on a time resource overlapping with the reception time for the first signal. The UE served by the fixed cell may determine a transmission symbol component based on the first signal and an interference component based on the second signal.

Equation 7 below represents a reception signal received by the UE served by the fixed cell when the moving cell is an interference source in the UE served by the fixed cell.

[Equation 7]

$$\hat{X}_0 = \left(\frac{|h_0|^2 + |h_1|^2 + |h_2|^2 + |h_3|^2}{2}\right) X_0 +$$

$$\frac{h_0^* q_0 Y_0 + h_0^* q_2 Y_0^* - h_2 q_1^* Y_1^* - h_2 q_3^* Y_1 + (h_2^* q_0 Y_0 + h_2^* q_2 Y_0^* + h_0 q_1^* Y_1^* + h_0 q_3^* Y_1)}{2}$$

$$\hat{X}_1 = \left(\frac{|h_0|^2 + |h_1|^2 + |h_2|^2 + |h_3|^2}{2}\right) X_1 +$$

$$\frac{h_0^* q_0 Y_0 + h_0^* q_2 Y_0^* - h_2 q_1^* Y_1^* - h_2 q_3^* Y_1 - (h_2^* q_0 Y_0 + h_2^* q_2 Y_0^* + h_0 q_1^* Y_1^* + h_0 q_3^* Y_1)}{2}$$

$$\hat{X}_2 = \left(\frac{|h_0|^2 + |h_1|^2 + |h_2|^2 + |h_3|^2}{2}\right) X_2 +$$

$$\frac{h_1^* q_0 Y_0^* + h_1^* q_2 Y_0^* - h_3 q_1^* Y_1^* - h_3 q_3^* Y_1 + (h_3^* q_0 Y_0^* - h_3^* q_2 Y_0^* + h_2 q_1^* Y_1^* - h_2 q_3^* Y_1)}{2}$$

-continued $$\hat{X}_3 = \left(\frac{|h_0|^2 + |h_1|^2 + |h_2|^2 + |h_3|^2}{2}\right) X_3 +$$

$$\frac{h_1^* q_0 Y_0^* + h_1^* q_2 Y_0^* - h_3 q_1^* Y_1^* - h_3 q_3^* Y_1 - (h_3^* q_0 Y_0^* - h_3^* q_2 Y_0^* + h_2 q_1^* Y_1^* - h_2 q_3^* Y_1)}{2}$$

In Equation 7, $q_0$ may represent a channel coefficient between a first transmitting antenna of the fixed cell and a receiving antenna of the moving cell, $q_1$ may represent a channel coefficient between a second transmitting antenna of the fixed cell and the receiving antenna of the moving cell, $q_2$ may represent a channel coefficient between a third transmitting antenna of the fixed cell and the receiving antenna of the moving cell, and $q_3$ may represent a channel coefficient between a fourth transmitting antenna of the fixed cell and the receiving antenna of the moving cell.

Referring to Equation 7, a transmission symbol component of $X_0$ may be $$\left(\frac{|h_0|^2 + |h_1|^2 + |h_2|^2 + |h_3|^2}{2}\right) X_0,$$

and an interference component of $X_0$ based on the second signal may be $$\frac{h_0^* q_0 Y_0 + h_0^* q_2 Y_0^* - h_2 q_1^* Y_1^* - h_2 q_3^* Y_1 + (h_2^* q_0 Y_0 + h_2^* q_2 Y_0^* + h_0 q_1^* Y_1^* + h_0 q_3^* Y_1)}{2}.$$

Further, a transmission symbol component of $X_1$ may be $$\left(\frac{|h_0|^2 + |h_1|^2 + |h_2|^2 + |h_3|^2}{2}\right) X_1,$$

and an interference component of $X_1$ based on the second signal may be $$\frac{h_0^* q_0 Y_0 + h_0^* q_2 Y_0^* - h_2 q_1^* Y_1^* - h_2 q_3^* Y_1 - (h_2^* q_0 Y_0 + h_2^* q_2 Y_0^* + h_0 q_1^* Y_1^* + h_0 q_3^* Y_1)}{2}.$$

Further, a transmission symbol component of $X_2$ may be $$\left(\frac{|h_0|^2 + |h_1|^2 + |h_2|^2 + |h_3|^2}{2}\right) X_2,$$

and an interference component of $X_2$ based on the second signal may be $$\frac{h_1^* q_0 Y_0^* + h_1^* q_2 Y_0^* - h_3 q_1^* Y_1^* - h_3 q_3^* Y_1 + (h_3^* q_0 Y_0^* - h_3^* q_2 Y_0^* + h_2 q_1^* Y_1^* - h_2 q_3^* Y_1)}{2}.$$

Further, a transmission symbol component of $X_3$ may be $$\left(\frac{|h_0|^2 + |h_1|^2 + |h_2|^2 + |h_3|^2}{2}\right) X_3,$$

and an interference component of $X_3$ based on the second signal may be $$\frac{h_1^* q_0 Y_0^* + h_1^* q_2 Y_0^* - h_3 q_1^* Y_1^* - h_3 q_3^* Y_1 - (h_3^* q_0 Y_0^* - h_3^* q_2 Y_0^* + h_2 q_1^* Y_1^* - h_2 q_3^* Y_1)}{2}.$$

Figure 9:
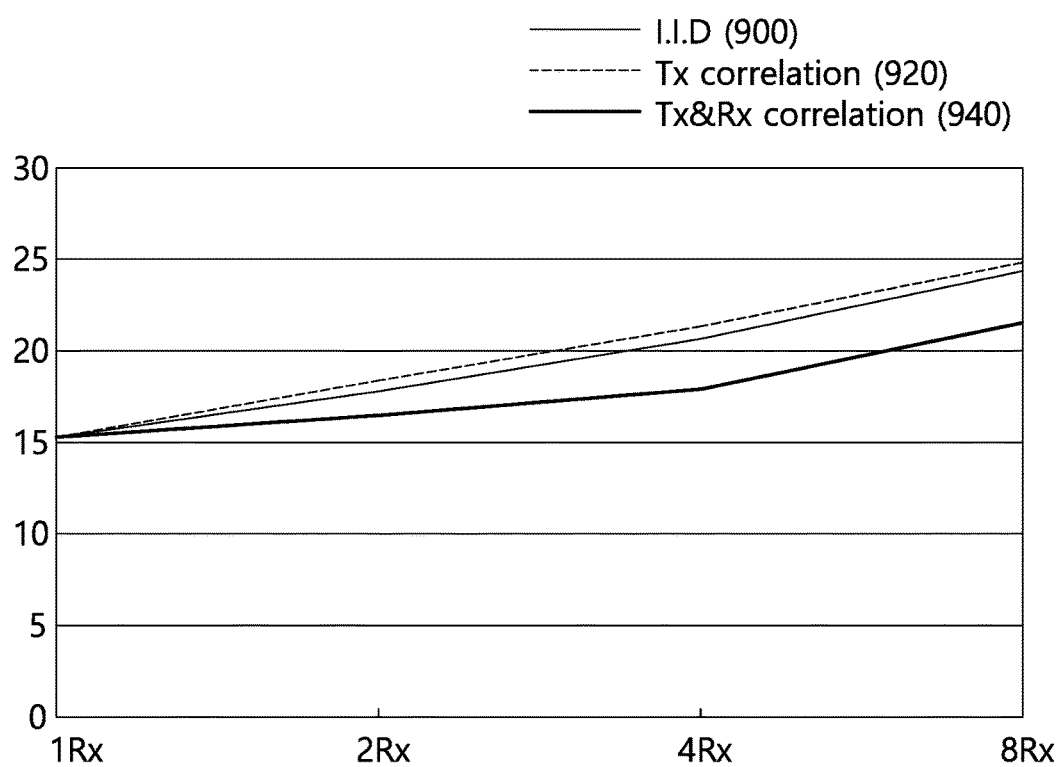
FIG. 9 is a conceptual view illustrating an SINR improvement based on interference averaging and interference randomization according to an embodiment of the present invention.

FIG. 9 is a conceptual view illustrating an SINR improvement based on interference averaging and interference randomization according to an embodiment of the present invention.

Referring to a graph in FIG. 9, an independent and identically distributed (IID) case 900 indicates that a correlation between transmitting antennas (Tx antennas) and a correlation between receiving antennas (Rx antennas) are 0. That is, IID shows a case in which all channels are independent.

A Tx correlation case 920 indicates that there is no correlation between Rx antennas but there is a correlation between Tx antennas. A correlation factor of the Tx correlation may be 0.5.

A Tx&Rx correlation case 940 indicates that that there is a correlation between Rx antennas and there is a correlation between Tx antennas. A correlation factor of the Rx correlation may be 0.5, and a correlation factor of the Tx correlation may be 0.5.

Referring to the graph, as the number of Rx antennas increases, the SINR is improved. Further, the SINR is further improved in the presence of the Tx correlation only and in the IID case than in the Tx&Rx correlation case FIG. 10 is a block diagram illustrating a wireless communication system according to an embodiment of the present invention.

Figure 10:
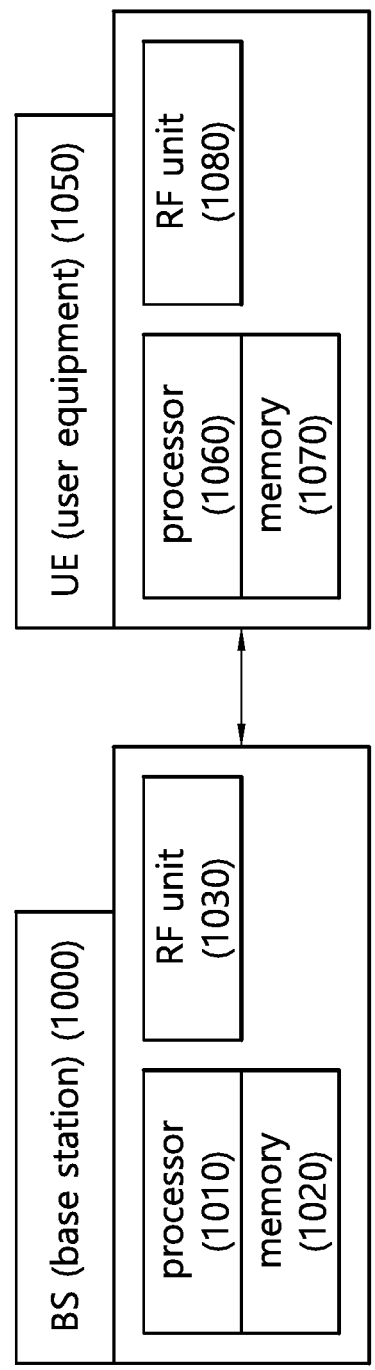
FIG. 10 is a block diagram illustrating a wireless communication system according to an embodiment of the present invention.

Referring to FIG. 10, a BS 1000 includes a processor 1010, a memory 1020, and a radio frequency (RF) unit 1030. The memory 1020 is connected with the processor 1010 and stores various pieces of information to operate the processor 1010. The RF unit 1030 is connected with the processor 1010 and transmits and/or receives radio signals. The processor 1010 implements the proposed functions, procedures, and/or methods. The operations of the BS in the aforementioned embodiments may be implemented by the processor 1010.

For example, when the BS is a fixed cell, the processor 1010 may be configured to transmit data to a UE based on the aforementioned STBC for the fixed cell. When the BS is a moving cell, the processor 1010 may be configured to transmit data to a UE based on the aforementioned STBC for the moving cell.

A wireless device 1050 includes a processor 1060, a memory 1070, and an RF unit 1080. The memory 1070 is connected with the processor 1060 and stores various pieces of information to operate the processor 1060. The RF unit 1080 is connected with the processor 1060 and transmits and/or receives radio signals. The processor 1060 implements the proposed functions, procedures, and/or methods. The operations of the wireless device in the aforementioned embodiments may be implemented by the processor 1060.

For example, the processor 1060 may be configured to receive a first signal generated based on a first STBC from the fixed cell and to receive a second signal generated based on a second STBC from a moving cell on a time resource overlapping with a reception time for the first signal. Further, the processor 1060 may be configured to determine a transmission symbol component based on the first signal and an interference component based on the first signal and the second signal. The first STBC may be determined based on a transmission symbol combination of the fixed cell, the second STBC may be determined based on a transmission symbol combination of the moving cell, and the interference component may be interference-averaged based on the first signal and the second signal.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

As described above, the present invention provides a method and a device enabling a terminal to select a wireless node for an uplink according to a predetermined condition when wireless connection is possible through different wireless networks.

In the above-described exemplary system, although the methods have been described in the foregoing embodiments on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for mitigating inter-cell interference, the method comprising:
    receiving, by a user equipment (UE) served by a fixed cell, a first signal generated based on a first space-time block code (STBC) from the fixed cell;
    receiving, by the UE, a second signal generated based on a second STBC from a moving cell on a time resource overlapping with a time resource on which the first signal is received; and
    determining, by the UE, a transmission symbol component based on the first signal and an interference component based on the second signal; and
    canceling, by the UE, the interference component of the second signal by averaging the interference component based on the first signal and the second signal,
    wherein the first STBC is determined based on a combination of transmission symbols of the fixed cell, and the second STBC is determined based on a combination of transmission symbols of the moving cell.

2. The method of claim 1, wherein the first STBC is a code for transmissions of different combinations of transmission symbols on one transmission resource,
the second STBC is a code for transmissions of the same combination of transmission symbols on one transmission resource,
the different combinations of the transmission symbols are repeatedly transmitted on a successive transmission resource continuing from the one transmission resource of the first STBC, and
a combination of transmission symbols, which is different from the same transmission symbol combination, is transmitted on a successive transmission resource continuing from the one transmission resource of the second STBC.

3. The method of claim 1, wherein the first STBC is $$\begin{bmatrix} Z_0 & Z_1^* & 0 & 0 \\ 0 & 0 & Z_2 & Z_3^* \\ Z_1 & -Z_0^* & 0 & 0 \\ 0 & 0 & Z_3 & -Z_2^* \end{bmatrix},$$

where each of $Z_0$, $Z_1$, $Z_2$, $Z_3$, is the combination of the transmission symbols of the fixed cell, in which $Z_0=X_0+X_1$, $Z_1=X_0-X_1$, $Z_2=X_2+X_3$ and $Z_3=X_2-X_3$, and $X_0$, $X_1$, $X_2$, $X_3$ is a transmission symbol of the fixed cell; and
the second STBC is $$\begin{bmatrix} Y_0 & 0 & Y_0 & 0 \\ 0 & Y_1 & 0 & Y_1 \\ Y_0^* & 0 & -Y_0^* & 0 \\ 0 & Y_1^* & 0 & -Y_1^* \end{bmatrix} \text{ or } \begin{bmatrix} Y_0 & 0 & 0 & Y_0 \\ 0 & Y_1 & Y_1 & 0 \\ Y_0^* & 0 & 0 & -Y_0^* \\ 0 & Y_1^* & -Y_1^* & 0 \end{bmatrix},$$

where each of $Y_0$, $Y_1$ is the combination of the transmission symbols of the moving cell, in which $Y_0=S_0+S_1$ and $Y_1=S_0-S_1$, and
$S_0$, $S_1$ is a transmission symbol of the moving cell.

4. The method of claim 3, wherein the transmission symbol component of $X^0$ based on the first signal is $$\left(\frac{|h_0|^2+|h_1|^2+|h_2|^2+|h_3|^2}{2}\right)X_0,$$

the interference component of $X_0$ based on the second signal is $$\frac{h_0^*q_0Y_0+h_0^*q_2Y_0^*-h_2q_1^*Y_1^*-h_2q_3^*Y_1+(h_2^*q_0Y_0+h_2^*q_2Y_0^*+h_0q_1^*Y_1^*+h_0q_3^*Y_1)}{2},$$

the transmission symbol component of $X_1$ based on the first signal is $$\left(\frac{|h_0|^2+|h_1|^2+|h_2|^2+|h_3|^2}{2}\right)X_1,$$

the interference component of $X_1$ based on the second signal is $$\frac{h_0^*q_0Y_0+h_0^*q_2Y_0^*-h_2q_1^*Y_1^*-h_2q_3^*Y_1-(h_2^*q_0Y_0+h_2^*q_2Y_0^*+h_0q_1^*Y_1^*+h_0q_3^*Y_1)}{2},$$

the transmission symbol component of based on the first signal is $$\left(\frac{|h_0|^2+|h_1|^2+|h_2|^2+|h_3|^2}{2}\right)X_2,$$

the interference component of $X_2$ based on the second signal is $$\frac{h_1^*q_0Y_0^*+h_1^*q_2Y_0^*-h_3q_1^*Y_1^*-h_2q_3^*Y_1+(h_3^*q_0Y_0^*-h_3^*q_2Y_0^*+h_2q_1^*Y_1^*-h_2q_3^*Y_1)}{2},$$

the transmission symbol component of based on the first signal is $$\left(\frac{|h_0|^2+|h_1|^2+|h_2|^2+|h_3|^2}{2}\right)X_3,$$

and
the interference component of $X_3$ based on the second signal is $$\frac{h_1^*q_0Y_0^*+h_1^*q_2Y_0^*-h_3q_1^*Y_1^*-h_2q_3^*Y_1-(h_3^*q_0Y_0^*-h_3^*q_2Y_0^*+h_2q_1^*Y_1^*-h_2q_3^*Y_1)}{2},$$

where $q_0$ represents a channel coefficient between a first transmitting antenna of the fixed cell and a receiving antenna of the moving cell, $q_1$ represents a channel coefficient between a second transmitting antenna of the fixed cell and the receiving antenna of the moving cell, $q_2$ represents a channel coefficient between a third transmitting antenna of the fixed cell and the receiving antenna of the moving cell, and $q_3$ represents a channel coefficient between a fourth transmitting antenna of the fixed cell and the receiving antenna of the moving cell.

5. A user equipment (UE) served by a fixed cell, the UE comprising:
a radio frequency (RF) unit configured to transmit or receive a radio signal; and
a processor operatively connected to the RF unit,
wherein the processor is configured to:
receive a first signal generated based on a first space-time block code (STBC) from the fixed cell;
receive a second signal generated based on a second STBC from a moving cell on a time resource overlapping with a time resource on which the first signal is received;
determine a transmission symbol component based on the first signal and an interference component based on the second signal; and canceling the interference component of the second signal by averaging the interference component based on the first signal and the second signal, wherein the first STBC is determined based on a combination of transmission symbols of the fixed cell, and the second STBC is determined based on a combination of transmission symbols of the moving cell.

6. The UE of claim 5, wherein the first STBC is a code for transmissions of different combinations of transmission symbols on one transmission resource, the second STBC is a code for transmissions of the same combination of transmission symbols on one transmission resource, the different combinations of the transmission symbols are repeatedly transmitted on a successive transmission resource continuing from the one transmission resource of the first STBC, and a combination of transmission symbols, which is different from the same transmission symbol combination, is transmitted on a successive transmission resource continuing from the one transmission resource of the second STBC.

7. The UE of claim 5, wherein the first STBC is $$\begin{bmatrix} Z_0 & Z_1^* & 0 & 0 \\ 0 & 0 & Z_2 & Z_3^* \\ Z_1 & -Z_0^* & 0 & 0 \\ 0 & 0 & Z_3 & -Z_2^* \end{bmatrix},$$

where each of $Z_0$, $Z_1$, $Z_2$, $Z_3$ is the combination of the transmission symbols of the fixed cell, in which $Z_0=X_0+X_1$, $Z_1=X_0-X_1$, $Z_2=X_2+X_3$ and $Z_3=X_2-X_3$, and $X_0$, $X_1$, $X_2$, $X_3$ is a transmission symbol of the fixed cell; and the second STBC is $$\begin{bmatrix} Y_0 & 0 & Y_0 & 0 \\ 0 & Y_1 & 0 & Y_1 \\ Y_0^* & 0 & -Y_0^* & 0 \\ 0 & Y_1^* & 0 & -Y_1^* \end{bmatrix} \text{ or } \begin{bmatrix} Y_0 & 0 & 0 & Y_0 \\ 0 & Y_1 & Y_1 & 0 \\ Y_0^* & 0 & 0 & -Y_0^* \\ 0 & Y_1^* & -Y_1^* & 0 \end{bmatrix},$$

where each of $Y_0$, $Y_1$ is the combination of the transmission symbols of the moving cell, in which $Y_0=S_0+S_1$ and $Y_1=S_0-S_1$, and $S_0$, $S_1$ is a transmission symbol of the moving cell.

8. The UE of claim 7, wherein the transmission symbol component of $X_0$ on the first signal is $$\left( \frac{|h_0|^2 + |h_1|^2 + |h_2|^2 + |h_3|^2}{2} \right) X_0,$$

the interference component of $X_0$ based on the second signal is $$\frac{h_0^* q_0 Y_0 + h_0^* q_2 Y_0^* - h_2 q_1^* Y_1^* - h_2 q_3^* Y_1 + (h_2^* q_0 Y_0 + h_2^* q_2 Y_0^* + h_0 q_1^* Y_1^* + h_0 q_3^* Y_1)}{2},$$

the transmission symbol component of $X_1$ based on the first signal is $$\left( \frac{|h_0|^2 + |h_1|^2 + |h_2|^2 + |h_3|^2}{2} \right) X_1,$$

the interference component of $X_1$ based on the second signal is $$\frac{h_0^* q_0 Y_0 + h_0^* q_2 Y_0^* - h_2 q_1^* Y_1^* - h_2 q_3^* Y_1 - (h_2^* q_0 Y_0 + h_2^* q_2 Y_0^* + h_0 q_1^* Y_1^* + h_0 q_3^* Y_1)}{2},$$

the transmission symbol component of based on the first signal is $$\left( \frac{|h_0|^2 + |h_1|^2 + |h_2|^2 + |h_3|^2}{2} \right) X_2,$$

the interference component of $X_2$ based on the second signal is $$\frac{h_1^* q_0 Y_0^* + h_1^* q_2 Y_0^* - h_3 q_1^* Y_1^* - h_3 q_3^* Y_1 + (h_3^* q_0 Y_0^* - h_3^* q_2 Y_0^* + h_2 q_1^* Y_1^* - h_2 q_3^* Y_1)}{2},$$

the transmission symbol component of based on the first signal is $$\left( \frac{|h_0|^2 + |h_1|^2 + |h_2|^2 + |h_3|^2}{2} \right) X_3,$$

and the interference component of $X_3$ based on the second signal is $$\frac{h_1^* q_0 Y_0^* + h_1^* q_2 Y_0^* - h_3 q_1^* Y_1^* - h_3 q_3^* Y_1 - (h_3^* q_0 Y_0^* - h_3^* q_2 Y_0^* + h_2 q_1^* Y_1^* - h_2 q_3^* Y_1)}{2},$$

where $q_0$ represents a channel coefficient between a first transmitting antenna of the fixed cell and a receiving antenna of the moving cell, $q_1$ represents a channel coefficient between a second transmitting antenna of the fixed cell and the receiving antenna of the moving cell, $q_2$ represents a channel coefficient between a third transmitting antenna of the fixed cell and the receiving antenna of the moving cell, and $q_3$ represents a channel coefficient between a fourth transmitting antenna of the fixed cell and the receiving antenna of the moving cell.

* * * * *